United States Patent
Pintauro et al.

(10) Patent No.: US 6,365,294 B1
(45) Date of Patent: Apr. 2, 2002

(54) SULFONATED POLYPHOSPHAZENES FOR PROTON-EXCHANGE MEMBRANE FUEL CELLS

(75) Inventors: Peter N. Pintauro, New Orleans, LA (US); Hao Tang, Montreal (CA)

(73) Assignee: The Administrators of The Tulane Educational Fund, New Orleans, LA (US)

(*) Notice: Subject to any disclaimer, the term of this patent is extended or adjusted under 35 U.S.C. 154(b) by 0 days.

(21) Appl. No.: 09/302,879

(22) Filed: Apr. 30, 1999

(51) Int. Cl.⁷ ................................. H01M 8/10
(52) U.S. Cl. ................. 429/33; 429/30; 429/40; 429/41; 429/46; 429/314; 429/315
(58) Field of Search ................ 429/33, 30, 40, 429/41, 46, 314, 315

(56) References Cited

U.S. PATENT DOCUMENTS 5,548,060 A * 8/1996 Allock et al. ............... 528/487

FOREIGN PATENT DOCUMENTS

| EP | 0 279 264 | * 8/1988 |
| JP | 53-139143 | * 12/1978 |

* cited by examiner

*Primary Examiner*—Laura Weiner
(74) *Attorney, Agent, or Firm*—Michael D. Carbo, P.L.C.; Michael D. Carbo; Ronald J. Ventola, II (57) ABSTRACT

The subject matter of this invention deals with sulfonated polyphosphazene-based cation-exchange membranes for proton-exchange membrane fuel cells where the polyphosphazene is crosslinked, non-crosslinked, suitably blended with one or more additional polymers, and/or impregnated into the void volume of an inert microporous membrane support and where the membranes operate in a hydrated state that is characterized by a high proton conductance and low water and methanol permeation rates. In particular, the invention relates to the use of poly[bis(3-methylphenoxy) phosphazene] as the base polymer, with sulfonated ion-exchange groups, for direct liquid-feed methanol fuel cells.

29 Claims, 6 Drawing Sheets

SULFONATED POLYPHOSPHAZENES FOR PROTON-EXCHANGE MEMBRANE FUEL CELLS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. CTS-9632079 awarded by the National Science Foundation.

BACKGROUND OF THE INVENTION

Direct methanol and $H_2/O_2$ proton exchange membrane (PEM) fuel cells are promising power generators for terrestrial and space applications where high energy efficiencies and high power densities are required. A critically important component of these devices is the proton conducting membrane. For a cationexchange membrane to be used in such fuel cells, a number of requirements are to be met, including: (I) High ionic (protonic) conductivity, (ii) dimensional stability (low/moderate swelling), (iii) low electro-osmotic water flow, (iv) mechanical strength and chemical stability over a wide temperature range, (vi) a high resistance to oxidation, reduction, and hydrolysis, and (vi) low hydrocarbon fuel cross-over rates (e.g., low methanol cross-over for direct methanol fuel cells). To date, those membranes reported in the open literature that conduct ions (protons) at moderate temperatures also possess a high methanol permeability and those membranes that do not transport methanol have a low proton conductivity.

Over the past decade, numerous membrane materials have been examined for use in hydrogen/oxygen and direct methanol fuel cells, including perfluorosulfonic acid membranes, such as Dupont's Nafion® (see, for example, Ticianelli, Derouin, Redondo, and Srinivasan, 1988, *J. Electrochem. Soc.*, 135, 2209), radiation-grafted copolymers of poly(styrene sulfonic acid) with either low-density poly (styrene), poly(tetrafluoroethylene)/poly (perfluoropropylene), or poly(tetrafluoroethylene) (Guzman-Garcia, Pintauro, Verbrugge, and Schneider, 1992, *J. Appl. Electrochem.*, 22, 204), γ-radiation-grafted cation-exchange membranes where styrene/divinylbenzene was grafted into poly(fluoroethylene-co-hexafluoropropylene) (Büchi, Gupta, Haas, and Scherer, 1995, *Electrochim. Acta*, 40, 345) and sulfonated styrene-ethylene/butylene-styrene triblock polymer (Wnek, Rider, Serpico, Einset, Ehrenberg, and Raboin, 1995, in *Proton Conducting Membrane Fuel Cells* I, S. Gottesfeld, G. Halpert, and A. Landgrebe, Eds., PV 95-23, The Electrochemical Society Proceedings Series, pp. 247–251). These polymers operate in a hydrated, water swollen state, which is necessary forfacile proton conduction. Unfortunately, the electro-osmotic water flows and methanol (liquid fuel) cross-over rates in these polymers are high. Additionally, some of the polymers are not chemically stable during long-time fuel cell operation ($HO_2$.radicals formed at the anode during oxygen reduction degrade the polymer).

Reinforced composite ion-exchange membranes have been used as proton-exchange materials in PEM fuel cells, where an ion-exchange polymer (normally a sulfonated perfluorinated polymer) is impregnated into a microporous polytetrafluoroethylene film (U.S. Pat. No. 5,525,436; Kolde, Bahar, Wilson, Zawodzinski, and Goftesfeld, 1995, "Proton Conducting Membrane Fuel Cells I," Electrochemical Society Proceedings, Vol. 95–23, p. 193). These composite membranes, which are identified by the GORE-SELECT trademark, are characterized by a high proton conductance and good mechanical properties, as is the case for homogeneous sulfonated perfluorinated polymer membranes. The methanol cross-over rates in homogeneous perfluorinated polymer membranes as well as the GORE-SELECT™ membranes, however, are unacceptably high at methanol liquid feed concentrations greater than or equal to about 1.0 M.

Another material being examined as a fuel cell proton-exchange membrane is acid-doped polybenzimidazole (PBI) (U.S. Pat. No. 5,525,436). At elevated temperatures (greater than 100° C.) these membranes exhibited good proton conductivity with low methanol cross-over rates. In contrast with traditional proton-exchange materials and the polyphosphazene membranes described in this patent application, the PBI membranes can not be used in a liquid feed methanol fuel cell because the acid dopant will leach out of the membrane and into the liquid methanol solution that is in contact with the membrane during fuel cell operation, resulting in a loss in proton conductivity.

Figure 1:
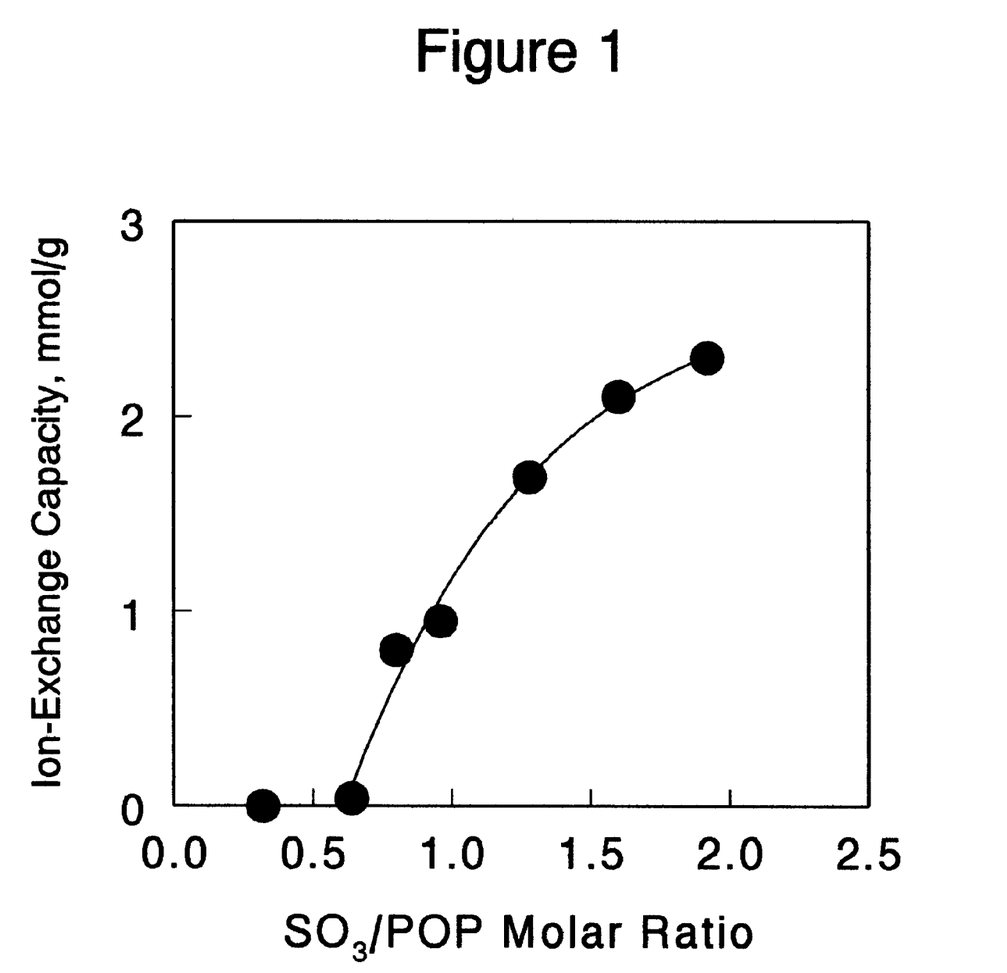
FIG. 1 is a graph of membrane ion-exchange capacity (IEC) vs the $SO_3$/polyphosphazene (POP) monomer molar ratio during sulfonation of poly[bis(3-methylphenoxy) phosphazene].

Polyphosphazenes, whose basic structure is shown in FIG. 1, are an interesting class of polymers that combine the attributes of a low glass transition temperature polymer (a high degree of polymer chain flexibility) with high-temperature polymer stability. From a synthetic viewpoint polyphosphazenes are the most highly developed of all the inorganic-backbone polymer systems (see, for example, Potin, and DeJaeger, 1991 *Eur. Polym. J.*, 27, 341). With appropriate functionalization of the phosphorous-nitrogen backbone, an unlimited number of specialty polymers can be synthesized. Thus, by the proper choice of R1 and R2 in the figure below, base polymers can be synthesized for eventual use in proton exchange membrane fuel cells (where the base polymer is chemically manipulated by the addition of sulfonate ion-exchange sites and/or chemical crosslinks).

The Chemical Structure of the Repeating Monomer Unit for a Functionalized Polyphosphazene.

Polyphosphazenes (without fixed ion-exchange groups) have been used as pervaporation and gas separation membranes (see, for example, Peterson, Stone, McCaffrey, and Cummings, 1993, *Sep. Sci. and Techn.*, 28,271) and as solvent-free solid polymer electrolyte membranes in lithium batteries, where there are no fixed charges attached to the polymer (Blonsky, Shriver, Austin, and Allcock, 1984, *J. Am. Chem., Soc.*, 106, 6854). No one has yet used sulfonated polyphosphazene cation-exchange membranes as proton conductors in fuel cells (where water sorption is needed for trans-membrane proton transport).

From both theoretical predictions and experimental measurements, it is known that a proton-exchange membrane for solid polymer electrolyte (SPE) fuel cell applications requires a high concentration of ion-exchange groups and some water content for proton conduction. There are limitations, however, to the ion-exchange group concentration in the film, imposed by the required solvent transport properties of the membrane, the polymer chemistry, and the osmotic stability of the polymer. Thus, as the ion-exchange capacity of the polymer increases, water (and polar solvent)

sorption by the polymer increases, resulting in unwanted polymer swelling (which may weaken the mechanical properties of the film) and unacceptably high liquid fuel (e.g., methanol) cross-over rates. It is also undesirable if the membrane water content were too low; a membrane's ionic conductivity decreases dramatically when the average number of water molecules per ion-exchange site is less than six and a low polymer water content may also affect adversely the electrochemical kinetics of oxygen reduction during fuel cell operation.

Water and polar solvent (e.g., methanol) uptake in fuel cell proton-exchange membranes are difficult to control because many PEM materials are not crosslinked and the polymer's water/methanol content is dependent on both the membrane's ion-exchange capacity and the polymer crystallinity (which itself decreases with an increase in the number of fixed ion-exchange groups). Sulfonated polyphosphazene membranes (with $SO_3^-$ ion-exchange groups attached to the polymer) offer a much wider range of possible structures and water/methanol transport rates because the number of ion-exchange groups in the membrane can be adjusted independently of the degree of crosslinking. With a suitably sulfonated and crosslinked polyphosphazene membranes, the problems of unwanted water transport and methanol cross-over that are common to traditional PEM materials can be overcome, yet the membrane conductance can be maintained sufficiently high, since crosslinking limits swelling and water/methanol absorption and transport.

In addition to chemical crosslinking, there is another method by which the mechanical and transport properties of a polyphosphazene-based cation-exchange membrane can be altered and improved for SPE fuel cell applications, that being the blending of a sulfonated polyphosphazene with a non-sulfonated polymer. One can blend the sulfonated phosphazene with either a non-sulfonated polyphosphazene or some other polymer with good chemical and thermal stability, such as a high glass transition temperature (glassy) polyimide or polyetherimide. The non-sulfonated polymer in the blend swells minimally in water or methanol and thus provides a mechanically stable framework that constrains the swelling of the sulfonated phosphazene polymer component when the membrane is exposed to water and/or methanol. Low water and methanol transport will accompany the decrease in swelling of such physically crosslinked sulfonated phosphazene polymers. Additionally, the sulfonated and/or non-sulfonated components of the polymer blend may be chemically crosslinked in order to further adjust and enhance the mechanical and transport properties of the solid polymer electrolyte membrane.

Another technique to improve upon the mechanical properties of the polyphosphazene-based proton exchange membrane and to create very thin proton conducting films, is to impregnate a sulfonated polyphosphazene polymer or a polymer blend containing a sulfonated polyphosphazene into the void volume of a microporous support membrane. The polymeric material for the support membrane (e.g., microporous polyvinylidene fluoride) must be chemically and thermally inert at the operating conditions of a SPE fuel cell. The support membrane should also swell minimally when exposed to water and hydrocarbon fuel (e.g., methanol). After impregnation of a sulfonated phosphazene polymer solution into a microporous film and evaporation of solvent, the polyphosphazene can be crosslinked to further improve its structure and transport properties. Polyphosphazene crosslinking can be carried out, for example, by exposing a dry composite membrane to γ-radiation or by dissolving a UV-light photoinitiator into the polymer impregnation solution followed by exposure of the dry composite membrane to UV light.

The subject matter of this invention deals with sulfonated polyphosphazene-based cation-exchange membranes for PEM fuel cells where the polyphosphazene is crosslinked, noncrosslinked, suitably blended with one or more additional polymers, and impregnated into the void volume of an inert microporous membrane support and where the membranes operate in a hydrated state that is characterized by a high proton conductance and low water and methanol permeation rates.

Preliminary membrane fabrication experiments with selected phosphazene polymers have been reported in the literature. For example, solid-state UV radiation crosslinking of non-sulfonated ethylphenoxy/phenoxy substituted polyphosphazene films has been examined (Wycisk, Pintauro, Wang, and O'Connor, 1996, *J. Appl. Polym. Sci.*, 59,1607). Also, non-crosslinked ion-exchange membranes were prepared from sulfonated methylphenoxy/phenoxy substituted phosphazene polymers (Wycisk and Pintauro, 1996, *J. Membr. Sci.*, 119 155). In this latter study, it was shown that ion-exchange membranes could not be prepared from ethylphenoxy/phenoxy substituted phosphazene polymers, when $SO_3$ was used as the sulfonating agent. In the above two studies, there was no specific attempt to fabricate a proton-exchange membrane from the sulfonated or crosslinked polyphosphazenes and the results provided no information as to the suitability of phosphazene polymers for fuel cell proton-exchange membranes. Individual membrane crosslinking and sulfonation experiments do not guarantee that one can either crosslink sulfonated polyphosphazene membrane, sulfonate a crosslinked membrane, or prepare a membrane by blending a sulfonated polyphosphazene and a non-sulfonated polymer. It is not possible to deduce from prior literature references, for example, whether a UV photo-initiator will solubilize in a dry phosphazene film when the polymer is partially sulfonated. Similarly, it is not known whether the presence of sulfonate fixed-charge groups on the polyphosphazene sidechains will interfere with the formation of UV-light-induced chemical crosslinks and whether the presence of polymer crosslinks will interfere with the sulfonation of the base polymer.

SUMMARY OF THE INVENTION

The subject matter of this invention relates to solid polymer electrolyte membranes comprised of a partially sulfonated polyphosphazene that conduct protons but exhibit a low methanol permeability when hydrated. The invention further relates to the use of such membranes in proton-exchange membrane fuel cells, such as hydrogen/oxygen and direct liquid-feed methanol fuel cells. In particular, the invention relates to polyphosphazene-based polymer electrolyte membranes that are comprised of one or more phosphazene polymers comprised of alkylphenoxy and/or phenoxy sidechains, where some portion of the these sidechains are sulfonated and where the sulfonated polymer is either non-crosslinked, crosslinked, blended with a non-sulfonated (or minimally sulfonated) polymer with no crosslinking, blended with a non-sulfonated (or minimally sulfonated) polymer with crosslinking, or impregnated into an inert microporous membrane support (with and without blending and/or phosphazene crosslinking).

DETAILED DESCRIPTION OF THE INVENTION

The invention of this patent relates to novel solid polymer electrolytes for proton-exchange membrane fuel cells that are hydrated during fuel cell operation, where such membranes possess the unique properties of low fuel (e.g., methanol) permeability and high proton conductance. Specifically, the invention deals with the use of membranes comprised of a partially sulfonated polyphosphazene that are suitable for use in direct liquid-feed methanol fuel cells. Examples of the base phosphazene polymer include, but are not limited to poly[bis(alkylphenoxy)phosphazene], poly [(alkylphenoxy)(phenoxy) phosphazene], phosphazene polymers that contain about 50 mol % alkylphenoxy sidechains, as well as other polyphosphazenes with sidechains that can be sulfonated. Of particular interest with respect to the invention of this patent is solid polymer electrolyte membranes fabricated from poly[bis(3-methylphenoxy)phosphazene] with sulfonate ion-exchange sites on some of the methylphenoxy sidechains, where the phosphazene polymer is sulfonated in solution first and where said sulfonated polymer is: (1) Formed into a film (membrane) without creating chemical crosslinks, (2) formed into a film followed by the creation of crosslinks, (3) blended with a non-sulfonated (or minimally sulfonated) polyphosphazene and then formed into a film (with/without crosslinking), and/or (4) blended with a non-sulfonated polyimide, polyetherimide, or some other chemically/ thermally stable/high glass transition temperature polymer and then formed into a film (with/without polyphosphazene crosslinking). Additionally, proton-exchange membranes can be formed by the following alternate sequence of steps: (1) Casting a non-sulfonated polymer into a thin film, (2) crosslinking the polymer, and then (3) adding sulfonate ion-exchange groups to a portion of the sidechains of the crosslinked polymer.

The sulfonated polyphosphazene solid polymer electrolyte membranes are unique in that they exhibit a low hydrocarbon (e.g., methanol) fuel crossover (from the anode to the cathode) and a high proton conductance when operating within a fuel cell in a hydrated state at temperatures below 100° C. Suitable crosslinking and/or blending allow the phosphazene membranes to be used at temperatures in excess of 100° C. The base phosphazene polymer contains sidechains that can be sulfonated, either before or after film fabrication. For example, poly[bis(3-methylphenoxy) phosphazene] can be sulfonated in solution to a specified ion-exchange capacity and the resulting polymer can be solution cast into a thin film. Solid-state polymer crosslinking can be achieved by dissolving a crosslinking photoinitiator into the membrane casting solution, casting the film, evaporating the solvent, and then exposing the dry polymer film to UV radiation (where the solubility of the photoinitiator is retained in the polymer after solvent removal). Alternatively, the sulfonated polyphosphazene can be solution cast into a thin film, dried, and then exposed to γ-radiation to create polymer crosslinks. To fabricate a blended membrane, where the non-sulfonated polymer acts as a physical crosslinker, a polyimide, a polyetherimide, a non-sulfonated polyphosphazene, and/or some other chemically inert and thermally stable non-sulfonated polymer (with a high glass transition temperature) is dissolved in the membrane casting solution with a sulfonated phosphazene polymer. The resulting blend is solution-cast into a thin film and then dried. The blended polymer membrane can be crosslinked in a manner similar to that used when the membrane is composed of a single sulfonated phosphazene polymer.

The general requirements of the base phosphazene polymer for fabricating proton-exchange membranes are as follows:

(a) For sulfonated and chemically crosslinked proton-exchange membranes (including blended membranes composite membranes with chemical crosslinking), the base polymer must contain: (i) A sufficient number of sidechains that can be sulfonated so as to impart an ion-exchange capacity in the range of about 0.5 mmol/g to about 1.9 mmol/g to the polymer with minimal or no polymer degradation and (ii) sidechains on the polymer backbone for chemical crosslinking (where crosslinks are formed either before or after polymer sulfonation).

(b) For sulfonated proton-exchange membranes with no chemical crosslinking (including blended membranes and composite membranes with no crosslinking), the base phosphazene polymer must contain a sufficient number of sidechains that can be sulfonated so as to impart an ion-exchange capacity in the range of about 0.5 mmol/g to about 1.9 mmol/g to the polymer with minimal or no polymer degradation.

Suitable phosphazene base-polymers that can be used to create a membrane with sulfonated ion-exchange sites and chemical crosslinks between the polyphosphazene chains include but are not limited to: poly[(bis(3-methylphenoxy) phosphazene], poly[(3-methylphenoxy)(phenoxy) phosphazene], poly[(3-ethylphenoxy)(phenoxy) phosphazene], poly[(3-methylphenoxy)(3-ethylphenoxy) phosphazene], poly[(4-methylphenoxy)(phenoxy) phosphazene], poly[(4-ethylphenoxy)(phenoxy)

phosphazene], poly[(4-methylphenoxy)(phenoxy) phosphazene]. The general structure of the monomer unit of these phosphazene polymers is:

The addition of $S_3^-$ fixed-charge (ion-exchange) groups to the polymer occurs on some portion of the aromatic sidechains where R' can be H (phenoxy sidechains) or an alkyl group (e.g., methylphenoxy or ethylphenoxy sidechains at various positions on the phenoxy ring). An R' alkyl group will activate the phenoxy ring for attack by a sulfonating agent such as $SO_3$. Alkyl groups can also be used to create chemical crosslinks between two polymer chains, for example, by means of a photo-initiator-induced hydrogen abstraction mechanism with UV light. The R sidechain on the P-N polymer backbone above can have a variety of functions, such as: (i) Providing locations for $S_3^-$ ion-exchange groups (e.g., R=phenoxy group or alkylphenoxy group), (ii) providing locations for $SO_3^-$ ion-exchange groups and chemical crosslinks (R=methylphenoxy orethylphenoxy group, for example), (iii) providing locations for polymer crosslinking only, (iv) changing the hydrophobicity of the final membrane (R=trifluoroethoxy, for example) and/or (v) improving the thermal and chemical stability of the sulfonated polymer (R=trifluoroethoxy, for example). There can be more than one type of R' group and R group within the same polymer (e.g., a polyphosphazene polymer with methylphenoxy, phenoxy, and ethylphenoxy sidechains) and the relative percentages of the various R'-phenoxy and R sidechains can be varied (e.g., poly[(4-ethylphenoxy)(phenoxy)phosphazene] with ethylphenoxy/phenoxy molar ratios of 2/1, 1/1, 1/2, etc.). The phosphazene polymers, with no sulfonate ion-exchange groups or with a minimal number of $SO_3^-$ groups, can be blended with a highly sulfonated polyphosphazene to create a phosphazene-blended proton-exchange membrane, as will be discussed below.

The polymer poly[bis(phenoxy)phosphazene] (R'=H and R=phenoxy) can be used in blends to alter the thermal and/or mechanical properties of the final proton-exchange membrane or to increase the ion-exchange capacity of the final membrane (via sulfonation of the phenoxy sidechains). This polymer can also be used as the sole base-material of a sulfonated and non-crosslinked proton-exchange membrane.

The subject invention will now be discussed with reference to the preferred embodiments of the invention, those being the use of a partially sulfonated poly[bis(3-methylphenoxy)phosphazene] polymer in non-crosslinked, crosslinked, and blended membranes. The following examples and characterization tests are intended to be merely exemplary and do not limit the subject of this invention. Reasonable variations of the various parameters presented below, as well as other aspects of the polymer and membrane materials, membrane preparation, and their use will be apparent to those skilled in the art and are intended to be covered by the specifications and claims of this application, if such variations fall within the bounds of the claims. Thus, one skilled in the art will be able to substitute suitable polymers as described above for the exemplified polymers and obtain meaningful results.

PEM PREPARATION

A. Materials and procedures for polymer sulfonation and membrane fabrication

Poly[bis(3-methylphenoxy)phosphazene], purchased from "technically" Inc., Andover, Mass., was used as the base polymer without further purification. The molecular weight of this polyphosphazene, as determined by gel permeation chromatography (Waters Styragel HT 6E column in THF), was about $2.0 \times 10^6$ daltons.

Method #1—Preparation of an ion-exchange membrane from a single, sulfonated phosphazene polymer casting solution This method describes the sulfonation of a polyphosphazene by dissolving the polymer in an appropriate solvent and then adding to the solvent an appropriate polymer sulfonating agent. Sulfonation with $SO_3$ is described next, but other sulfonating agents (e.g., chlorosulfonic acid, oleum, or acetyl sulfate) can be used in place of $SO_3$. A known weight of phosphazene polymer (1.0 g) was first dissolved in 40 ml of 1,2-dichloroethane (DCE) and stirred for 24 h at 50° C. A given amount of $SO_3$ in 10 ml of DCE was then added dropwise to the polymer solution in a dry nitrogen atmosphere. The resulting precipitate was stirred for 3 h at 0° C. followed by the addition of 50 ml of a dilute NaOH solution (water/methanol solvent) to terminate the reaction. After evaporation of solvent at 70° C. for 24 h, the polymer was pre-conditioned by soaking sequentially in distilled water, 0.1 M NaOH, distilled water, 0.1 M HCl, and distilled water (each soaking was for 48 hours). The polymer product was then dried thoroughly and dissolved in N, N-dimethylacetamide (DMAc). Proton-exchange membranes were cast from this solution (about 5 wt/vol % polymer) on a polypropylene plate and then dried at 70° C. for 3 days.

Method #2—Fabrication of proton-exchange membranes by blending two phosphazene polymers with different ion-exchange capacities.

This method is intended to show that two polyphosphazene polymers, each with a different concentration of sulfonate ion-exchange groups, can be blended together and cast into a membrane. The two polymers can have different sidechains, although the example given here deals with two sulfonated poly[bis(3-methylphenoxy)phosphazene] polymers, one with an ion-exchange capacity (IEC) in the range of about 1.4 to about .1.6 mmol/g and the other with an IEC in the range of 0.0 to about 1.0 mmol/g were each dissolved separately in N, N-dimethylacetamide at a concentration of 2–10 wt % (the 0.0 IEC phosphazene polymer was not contacted with a sulfonating agent and thus has zero ion-exchange capacity). The solutions were stirred at 40–50° C. for 24 hours. Specified amounts of the high and low IEC polymer/DMAc solutions were combined (e.g., to create a membrane with 50 wt % high IEC polymer and 50 wt % low IEC polymer) and stirred for 10 hours at a temperature of 40–50° C. A proton-exchange membrane was made by spreading the resulting solution on a clean and flat surface and then evaporating the solvent at 60–70° C. for 2–3 days. The particular amount of each polymer in the blend is determined by the required final ion-exchange capacity of the resulting membrane. To create crosslinks in the blended polymer film, between about 5 wt % and about 20 wt % benzophenone is dissolved in the blended membrane casting solution. A membrane is then cast on a clean, flat plate and the solvent is allowed to evaporate completely. After solvent removal, the membrane is exposed to UV light for a sufficient time to react all of the photo-initiator.

Method #3— Fabrication of a blended membrane from a sulfonated phosphazene polymer and a non-phosphazene polymer.

This method is intended to show that a sulfonated phosphazene polymer can be blended with a non-sulfonated, non-phosphazene polymer, such as a polyimide or polyetherimide. A sulfonated phosphazene polymer (1.4 mmol/g sulfonated poly[bis(3-methylphenoxy)phosphazene] and a polyetherimide (poly(bisphenol A-co-A-nitrophthalic anhydride-co-1,3, phenylenediamine)) were each dissolved in DMAC solvent at a polymer concentration of between about 2 wt/vol % and 5 wt/vol %. Each solution was stirred for 24 hours at a temperature of 40–50° C. Specified amounts of the phosphazene and polyetherimide solutions were combined and the resulting solution was stirred at 50° C. for another 5 hours. The polyetherimide content of the final blended membrane ranged from about 5 wt % to about 40 wt %. The polymer blend solution was cast on a flat plate and the solvent was removed by heating at about 60° C. for 2–3 days. One skilled in the art would recognize that a blended membrane could also be prepared from a sulfonated polyphosphazene and a suitably chosen polyimide, where both polymers are dissolved in a single solvent and then solution cast into membranes. Additionally, one skilled in the art would recognize that a blended membrane could also be prepared by solubilizing in a suitably chosen solvent the sulfonated phosphazene polymer and the monomer species that constitute the polyimide or polyetherimide, in which case the polyimide or polyetherimide forms from their monomers after film casting and during solvent evaporation at a sufficiently high temperature. Under appropriate membrane casting conditions, one can create an interpenetrating polymer network with the sulfonated polyphosphazene and non-phosphazene polymers. Chemical crosslinks between polyphosphazene chains can be created in such blended membranes. For example, an appropriate UV photo-initiator is dissolved in the blended polymer membrane casting solution, a flat sheet membrane is cast, the solvent is evaporated at an elevated temperature, and then the membrane is exposed to UV light.

Method #4—Preparation of a sulfonated and crosslinked polyphosphazene membrane by film casting, polymer crosslinking, and then polymer sulfonation.

This method describes the preparation of a sulfonated polyphosphazene proton-exchange membrane by first casting the non-sulfonated polymer into a thin film followed by polymer crosslinking and then exposing the film to a sulfonating agent such as $SO_3$, chlorosulfonic acid, oleum, or acetyl sulfate. For example, poly[bis(3-methylphenoxy) phosphazene] and 15 mol % benzophenone were dissolved in tetrahydrofuran. Membranes were cast from this solution onto polypropylene plates and the solvent was evaporated in darkness. Each face of the membranes was exposed to UV light (365 nm wavelength, 2.8 W/cm$^2$ intensity) in a nitrogen atmosphere at 25° C. for about 5 hours in order to crosslink the polymer. The crosslinked films were soaked in a given chlorosulfonic acid/dichloroethane solution for a specified period of time in order to attach sulfonate groups to the methylphenoxy sidechains of the polyphosphazene. After the sulfonation step, the membranes were soaked in dilute NaOH and then deionized/distilled water. The ion-exchange capacity of the resulting membranes was then determined using standard experimental techniques. Representative examples of crosslinked and then sulfonated membranes prepared by this method are listed in Table 1. Increasing the concentration of chlorosulfonic acid for polymer sulfonation and/or the time of chlorosulfonic acid contact with the membrane increases the membrane ion-exchange capacity.

TABLE 1

Sulfonated Polyphosphazene Solid Polymer Electrolyte Membranes Prepared by Method #4, with Poly[bis(3-methylphenoxy)phosphazene]

| Concentration of Chlorosulfonic Acid for Polymer Sulfonation | Time for Chlorosulfonic Acid Soak | Membrane Ion-Exchange Capacity (mmol/g) |
|---|---|---|
| 10% | 5 minutes | 0.964 |
| 5% | 10 minutes | 1.45 |
| 30% | 5 minutes | 1.91 |

Method #5—Preparation of sulfonated ethylphenoxy/ phenoxy-substituted polyphosphazene membranes with $SO_3$ in the presence of Triethyl Phosphate.

It was shown previously that phosphazene polymers containing ethylphenoxy and phenoxy sidechains could not be sulfonated with $SO_3$ without significant polymer degradation (Wycisk and Pintauro, 1996, *J. Membr. Sci.*, 119 155). This method is intended to show that this polymer degradation problem can be overcome and that useable ion-exchange membrane materials can be can be synthesized from ethylphenoxy/phenoxy-substituted phosphazene polymers by sulfonating the polymer with $SO_3$ in the presence of triethyl phosphate (TEP). The polymer sulfonation procedure follows. A know weight (e.g., 1.0 gram) of poly[(4-ethylphenoxy)(phenoxy)phosphazene] polymer was dissolved in a known volume (e.g., 40 ml) of 1,2-dichloroethane (DCE). Sulfonating agent solutions were prepared by adding a given amount of $SO_3$ and TEP to 10 ml of DCE solvent and allowing the mixture to stand at room temperature for 12 hours. The sulfonating solution was then added dropwise to the polymer/DCE solution at 0° C. and in a dry nitrogen atmosphere. The resulting precipitate was stirred for 3 hours at 0° C. followed by the addition of 50 ml of a dilute NaOH solution (water/alcohol solvent) to terminate the reaction. After evaporation of solvent at 70° C. for 24 h, the polymer was preconditioned by soaking sequentially in distilled water, 0.1 M NaOH, distilled water, 0.1 M HCl, and distilled water (each soaking was for 48 hours). The ion-exchange capacity of the sulfonated polymers was then measured. Representative results from these polymer sulfonation experiments are listed in Table 2.

TABLE 2

Sulfonation of Poly[(4-ethylphenoxy)(phenoxy)phosphazene] with $SO_3$ in the Presence of Triethyl Phosphate

| $SO_3$/TEP/polyphosphazene molar ratio | Polymer Ion-Exchange Capacity (mmol/g) |
|---|---|
| 1.28/0.36/1.0 | 0.28 |
| 1.28/0.31/1.0 | 0.53 |
| 1.28/0.26/1.0 | 0.74 |

Method #6—Creating Crosslinks in a Sulfonated Polymer Membrane

To fabricate a crosslinked membrane from a sulfonated phosphazene polymer, an appropriate amount of benzophenone (BP)photo-initiator (ranging from about 5 mol % BP to about 25 mol % BP) was added to and dissolved in a solution consisting of the sulfonated polyphosphazene and DMAc solvent. Flat sheet membranes were cast on a clean and dry surface from this solution. The resulting films were dried in darkness and then irradiated with UV light (365 nm wavelength, 2.8 mW/cm$^2$ intensity) under an Argon atmosphere at 25° C. for 15–20 hours, depending on membrane thickness (the time of UV light exposure should be sufficient to consume all of the photoinitiator). To further insure complete consumption of the photo-initiator, the membrane was turned over so that both membrane surfaces were fully exposed to UV light. Other methods that would be apparent to a skilled artisan can also be used to create polymer crosslinks in the sulfonated phosphazene polymer membranes, including exposure of the membranes to γ-radiation for a specified period of time.

PEM CHARACTERIZATION

A. Ion-exchange capacity and equilibrium swelling measurements

The ion-exchange capacity (IEC, with unit of mmol/g of dry polymer) of sulfonated polyphosphazene membranes was determined by measuring the concentration of H$^+$ that exchanged with Na$^+$ when acid-form membrane samples were equilibrated with a NaCl solution. A known weight of dry polymer (for example, 0.2–0.4 g) in the acid form was placed into 100 ml of a 2.0 M NaCl solution and shaken occasionally for 48 hours. Three 25 ml samples were then removed and the amount of H$^+$ released by the polymer was determined by titration with 0.01 M NaOH. The measured ion-exchange capacity of sulfonated poly[bis(3-methylphenoxy)phosphazene] membranes is plotted vs. the SO$_3$/polyphosphazene (henceforth denoted as POP) monomer molar ratio in FIG. 1.

B. Membrane Swelling by Water and Methanol

Figure 2:
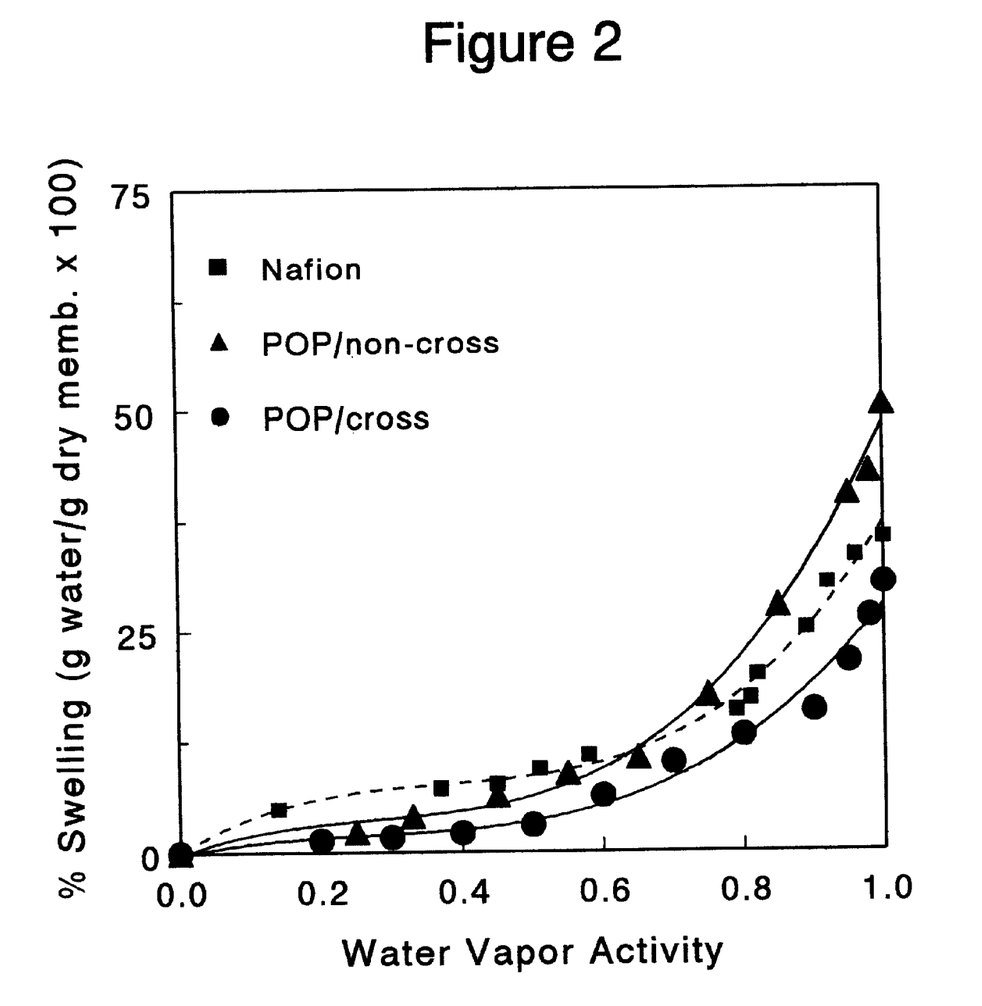
FIG. 2 is a graph showing the water swelling of sulfonated and sulfonated/crosslinked poly[bis(3-methylphenoxy) phosphazene] and Nafion® 117 membranes as a function of water activity at 25° C. The polyphosphazene membranes have an IEC of 1.4 mmol/g. Polyphosphazene crosslinking was achieved using 15 mol % benzophenone and UV light.

Equilibrium swelling by water and methanol in sulfonated poly[bis(3-methylphenoxy)phosphazene] (POP) membranes was determined under controlled water vapor and methanol activity conditions using a McBain quartz-spring microbalance sorption apparatus. All measurements were made on membrane samples in the H$^+$ form. Swelling was first calculated as the % increase in the dry membrane weight. For unit activity swelling with water, a membrane was equilibrated in liquid water. The equilibrium water sorption curves as a function of water vapor activity at 30° C. for crosslinked (15 mol % BP) and non-crosslinked 1.4 mmol/g IEC sulfonated poly[bis(3-methylphenoxy)phosphazene] membranes are shown in FIG. 2. For comparison purposes, water swelling of a Nafion® 117 membrane (IEC=0.909 mmol/g) is also shown in this figure. Although the concentration of fixed charges in the polyphosphazene was higher than that in Nafion, the crosslinked membrane swelled less due to the presence of polymer crosslinks. Without crosslinking, the IEC 1.4 mmol/g POP membrane swelled ≈48% (19 water molecules per SO$_3^-$ site) in liquid water at 30° C., whereas the swelling of the membrane crosslinked with 15% benzophenone was only 33% (13 water molecules per SO$_3^-$ site). These results show clearly that polymer crosslinking restricts polymer swelling. Methanol vapor uptake in the crosslinked (15 mol % BP) polyphosphazene membrane is compared to that for Nafion® 117 in Table 3 for a methanol activity of 0.6 and 0.9 and a temperature of 30° C. and 45° C. As was the case for water sorption, the POP membrane swelled less than Nafion® 117 in methanol vapor.

TABLE 3

Equilibrium methanol vapor uptake at 30° C. in a 1.4 IEC/crosslinked poly[bis(3-methylphenoxy)phosphazene] membrane and in a Nafion ® 117.

| Methanol Vapor Activity | % Methanol Uptake (dry membrane basis) | Methanol molecules per SO$_3^-$ Sites |
|---|---|---|
| Polyphosphazene | | |
| 0.6 | 5.4 | 1.2 |
| 0.8 | 10.5 | 2.3 |
| 0.9 | 12.5 | 2.8 |
| Nafion ® 117 | | |
| 0.6 | 9.2 | 3.2 |
| 0.8 | 12.8 | 4.4 |
| 0.9 | 15.1 | 5.2 |

C. Water and Methanol Diffusivity

Water and methanol diffusion coefficients in sulfonated poly[bis(3-methylphenoxy)phosphazene] were determined by a weight loss method, using a McBain quartz-spring micro-balance sorption apparatus and a thick membrane (400–600 μm) to minimize surface drying effects. After a membrane sample was fully equilibrated with water vapor at an activity of 0.98 or methanol vapor at an activity of either 0.80 or 0.90, the vapor activity was lowered by 5% and the membrane weight loss was recorded with time. The diffusion coefficient was then computed from the initial straight-line slope of a weight loss vs. square-root of time plot. Experiments were repeated at various temperatures.

Figure 3:
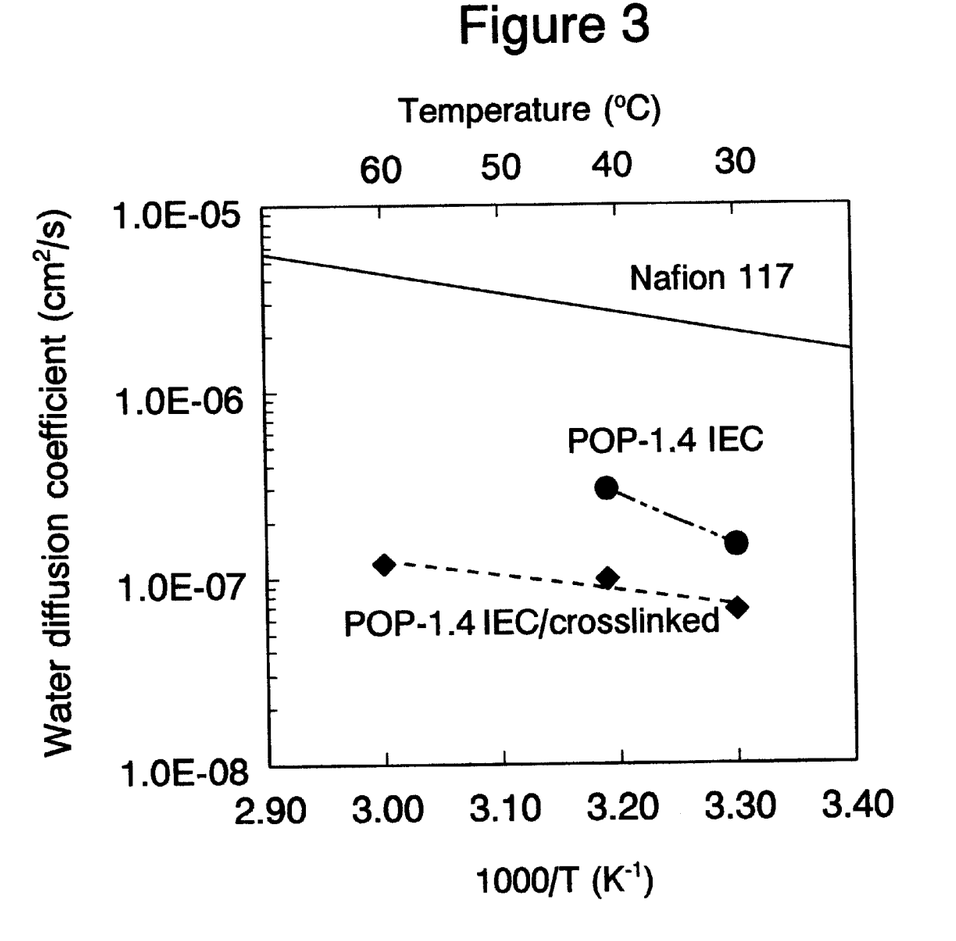
FIG. 3 is a graph of water diffusivity vs reciprocal temperature in crosslinked (with 15 mol % benzophenone and UV light) and non-crosslinked membranes composed of sulfonated poly[bis(3-methylphenoxy)phosphazene] (POP) with an IEC of 1.4 mmol/g. Also shown is water diffusivity/ reciprocal temperature plot for a Nafion® 117 membrane.

The temperature dependence of measured water diffusion coefficients in sulfonated/crosslinked (15 mol % BP) and sulfonated/non-crosslinked poly[bis(3-methylphenoxy)phosphazene] (abbreviated as POP) membranes is presented in FIG. 3, along with literature data for the self diffusion coefficient of water in Nafion® 117. The water diffusion coefficients in the polyphosphazene membranes were low ($\leq 1.2 \times 10^{-7}$ cm$^2$/s for a crosslinked membrane) and significantly smaller than that in Nafion® 117. Even the sulfonated and non-crosslinked POP membrane, which swelled more in water than the Nafion® film, was more effective than Nafion® in restricting water diffusion.

Methanol diffusion coefficients were measured in crosslinked poly[bis(3-methylphenoxy)phosphazene] membranes (15 mol % BP), using the weight loss method and the McBain sorption balance apparatus. Diffusivities at 30° C. and 0.80 methanol vapor activity and 45° C. and a methanol activity of 0.80 or 0.90 are listed in Table 4. As was the case for water diffusion, the methanol diffusivity in the crosslinked polyphosphazene film was found to be very small (1.6–8.5×10$^{-8}$ cm$^2$/s).

TABLE 4

Methanol diffusion coefficients in crosslinked 1.4 mmol/g IEC poly[bis(3-methylphenoxy)phosphazene] membranes.

| | Methanol Diffusion Coefficient (cm$^2$/s) |
|---|---|
| Crosslinked POP (IEC = 1.40 mmol/g) | 1.62 × 10$^{-8}$ (at 30° C.; methanol vapor activity = 0.80) |
| | 7.50 × 10$^{-8}$ (at 45° C.; methanol vapor activity = 0.80) |
| | 8.50 × 10$^{-8}$ (at 45° C.; methanol vapor activity = 0.90) |

D. Proton Conductivity

The electrical conductivity of protons in water-equilibrated poly[bis(3-methylphenoxy)phosphazene] membranes in the $H^+$ form (where only protons that are associated with fixed charges can carry the current) was determined using an AC impedance method. Membrane samples were first soaked in deionized and distilled water for 24 hours. The longitudinal (x-y) conductivity was measured using a pair of pressure-attached, high surface area platinum electrodes, as described in the literature. The mounted sample was immersed in deionized and distilled water at a given temperature and measurements were made from 1 Hz to $10^5$ Hz using a PAR Model 5210 amplifier and a PAR Model 273 potentiostat/galvanostat. Both real and imaginary components of the impedance were measured and the real Z-axis intercept was closely approximated. The cell constant was calculated from the spacing of the electrodes, the thickness of the membrane, and the area of the platinum electrodes.

Figure 4:
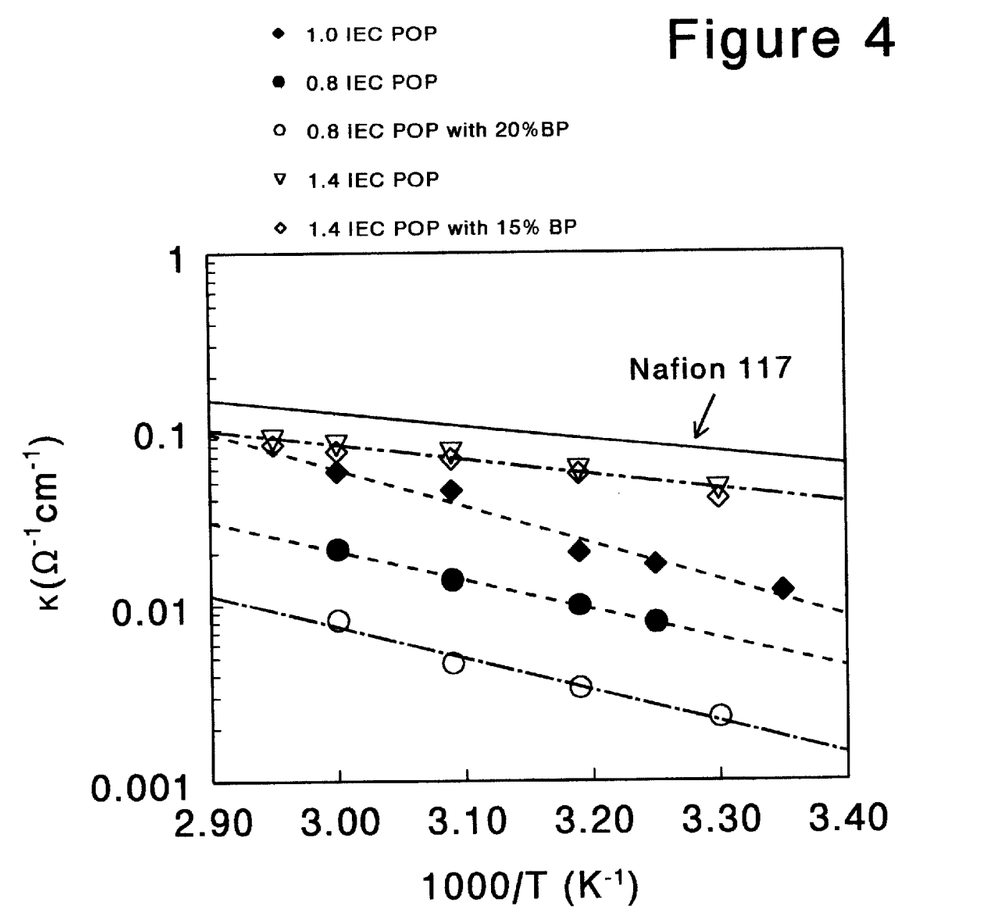
FIG. 4 is a graph showing the proton conductivity of a variety of sulfonated poly[bis(3-methylphenoxy) phosphazene] membranes, with and without crosslinking and with different ion-exchange capacities, as a function of the reciprocal temperature. Crosslinking was achieved using UV light and benzophenone (BP)photoinitiator at a concentration of 15 mol % or 20 mol %.

Proton conductivities in liquid-water-equilibrated sulfonated polyphosphazene membranes (0.8, 1.0, and 1.4 mmol/g IEC without crosslinking and 0.8 and 1.4 mmovlg IEC with crosslinking using either 15 mol % or 20 mol % benzophenone) were measured at temperatures ranging from 30° C. to 65° C. The membrane thicknesses ranged from about 100 μm to about 200 μm. The results are compared with literature data for Nafion® 117 in FIG. 4. The conductivities of the crosslinked and non-crosslinked 1.4 mmol/g IEC polyphosphazene membranes were essentially identical throughout the temperature range investigated and were approximately 70–80% that in Nafion®. The conductances of the crosslinked and non-crosslinked 1.4 mmol/g IEC polyphosphazene (defined as the conductivity divided by the membrane thickness) ranged from about $2\Omega^{-1}$ $cm^{-2}$ to about 10 $\Omega^{-1}$ $cm^{-2}$, depending on temperature. These conductances are high (for membrane evaluation purposes, a polyphosphazene membrane conductance greater than about $1\Omega^{-1}$ $cm^{-2}$ can be considered high) and are comparable to those of commercially available Nafion® 117 and some GORE-SELECT™ proton-exchange membrane materials (Kolde, Bahar, Wilson, Zawodzinski, and Gottesfeld, 1995, "Proton Conducting Membrane Fuel Cells I," Electrochemical Society Proceedings, Vol. 95–23, p. 193). Polyphosphazene membrane conductances greater than $10\Omega^{-1}$ $cm^{-2}$ can be achieved by increasing the temperature and by making the membrane thinner than 100 μm.

The proton conductivities and conductances of a blended membrane, composed of 70 wt % partially sulfonated poly[bis(3-methylphenoxy)phosphazene] and 30 wt % poly(bisphenol A-co-A-nitrophthalic anhydride-co-1,3, phenylenediamine), are listed in Table 5 at temperatures between 25° C. and 80° C. the membrane was prepared using the procedures outlined above in Method #3. The ion-exchange capacity of the blended membrane was 1.05 mmol/g and the water swelling at 25° C. was 35%. Measurements were made on 100 μm thick wet films that were equilibrated in deionized/distilled water. The proton conductance in the blended membranes was high and ranged from 2.0–5.5$\Omega^{-1}$ $cm^{-2}$.

TABLE 5

Proton Conductivities and Conductances of a Blended Sulfonated Phosphazene/Polyetherimide Membrane in Water

| Temperature (° C.) | Protons Conductivity ($\Omega^{-1}$ $cm^{-1}$) | Conductance ($\Omega^{-1}$ $cm^{-2}$) |
|---|---|---|
| 25 | 0.02 | 2.0 |
| 40 | 0.03 | 3.0 |
| 70 | 0.05 | 5.0 |
| 80 | 0.055 | 5.5 |

E. Thermo-mechanical and Chemical Stability Properties

Figure 5:
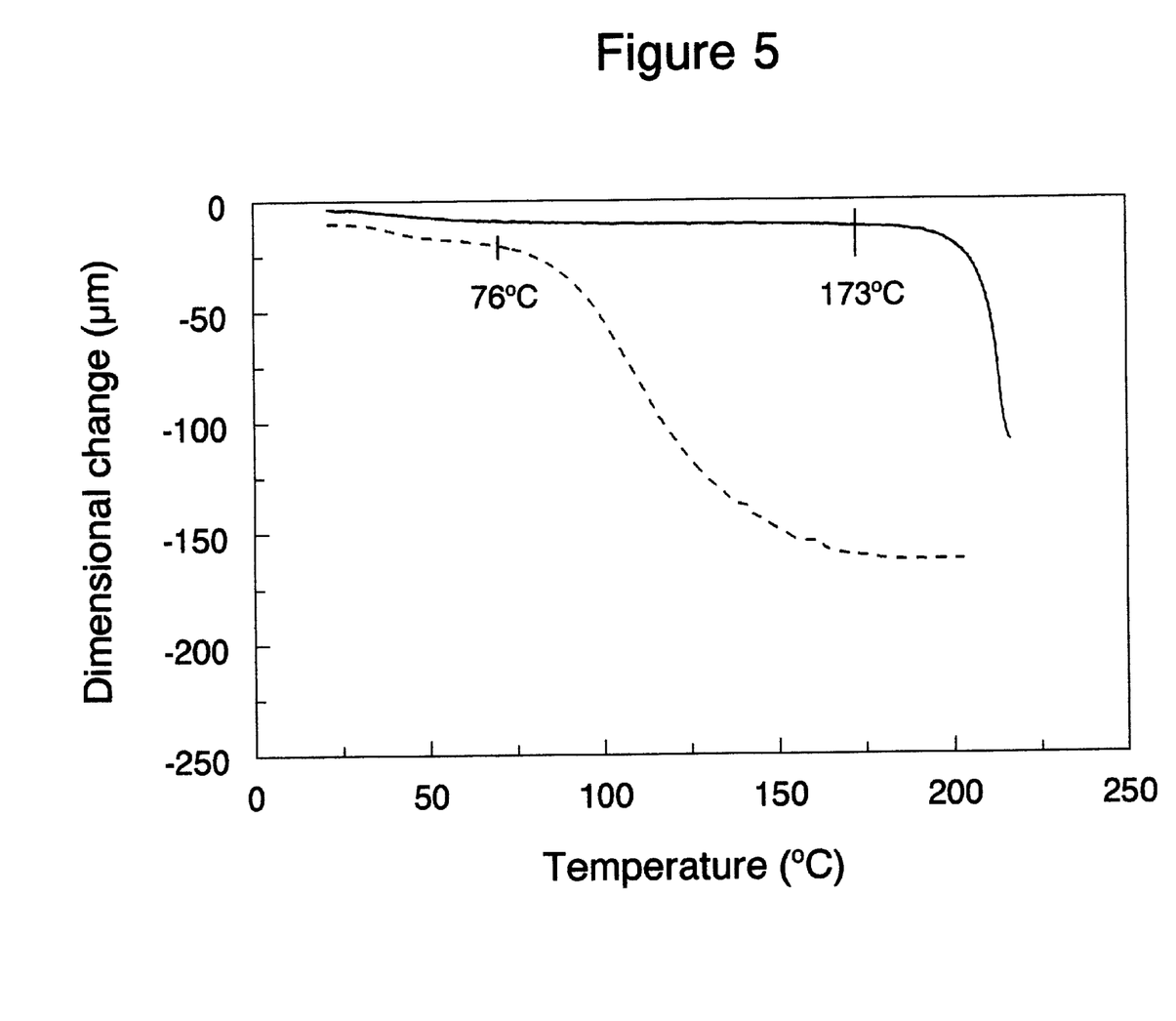
FIG. 5 is a graph showing the thermo-mechanical analysis plots of sulfonated poly[bis(3-methylphenoxy) phosphazene] membranes with crosslinking (—) and without crosslinking (—). Polyphosphazene crosslinking. was achieved using 15 mol % benzophenone and UV light.

The mechanical properties of crosslinked and non-crosslinked poly[bis(3-methylphenoxy)phosphazene] films were measured as a function of temperature using a TMA 2940 Thermomechanical analyzer, operating in the probe penetration mode. Membrane samples (≈150 μm in thickness) were heated in air at a rate of 10° C./min. The load for the penetration probe ranged from 0.1–0.5 N (pressures of 160–800 kPa).The effect of temperature on polymer softening for sulfonated/crosslinked (15 mol % BP) and sulfonated/non-crosslinked phosphazene (POP) membranes (IEC=1.4 mmol/g) is shown in FIG. 5. Crosslinking greatly improved the polymer's mechanical properties at elevated temperatures. The noncrosslinked POP membrane began to soften and deform at 76° C. for a small penetration probe pressure of 160 kPa (24 psig), whereas the crosslinked POP film was mechanically stable up to 173° C. for a probe pressure as high as 800 kPa (118 psig).

Figure 6:
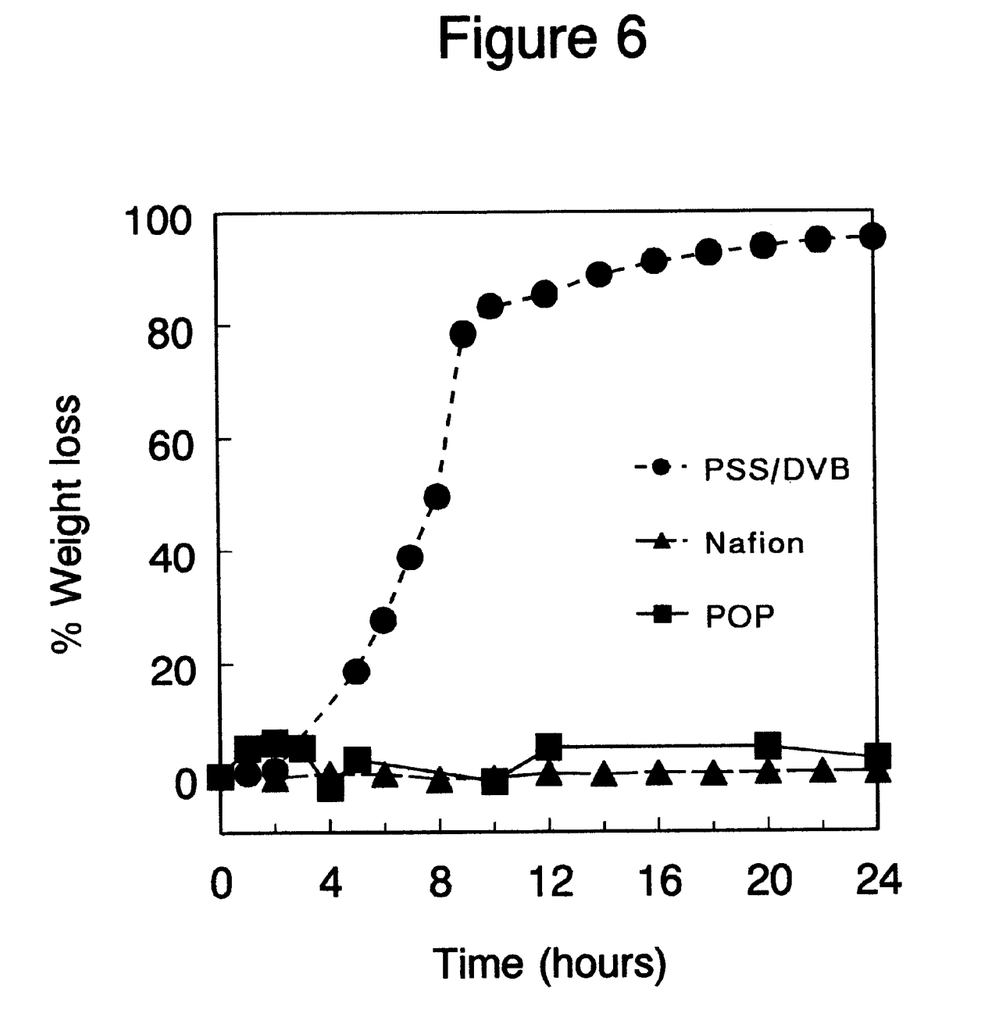
FIG. 6 is a graph illustrating the chemical stability of a crosslinked and sulfonated poly[bis(3-methylphenoxy) phosphazene] film (1.4 mmol/g IEC with 15 mol % benzophenone), a Nafion® 117 membrane, and a Tokuyama Soda CMX, polystyrene sulfonate (PSS)/divinyl benzene (DVB) membrane, as measured by polymer weight loss when the films were exposed to an aqueous solution of 3% $H_2O_2$ with 3 ppm $Fe^{2+}$ at 68° C.

To evaluate whether sulfonated/crosslinked (15 mol % BP) polyphosphazene membranes can withstand exposure to a strong oxidizing environment without degradation, membrane samples were soaked in an aqueous 3% $H_2O_2$ solution containing 4 ppm $Fe^{2+}$ at 68° C. Periodically, over a 24 hour period, the membrane was removed from the peroxide solution, wiped with filter paper to remove excess liquid, and weighed. As shown in FIG. 6, a minimal membrane weight loss (<5%) was observed for the sulfonated polyphosphazene membrane, indicating excellent chemical stability. A comparison of FTIR spectra before and after the 24 hour peroxide soak showed: (i) No new IR peaks and (ii) no change in the P—N (1,243 $cm^{-1}$), SO=O (1,085 $cm^{-1}$), and P—O—ϕ(1,140 $cm^{-1}$) stretching bands of the original sulfonated membrane. For comparison purposes, the weight loss vs. time results for a Nafion® 117 membrane and a Tokuyama Soda CMX cation-exchange membrane (composed of sulfonated polystyrene, crosslinked with divinyl benzene) are also shown in FIG. 6.

F. Measurement of Methanol Cross-Over

A sulfonated poly[bis(3-methylphenoxy)phosphazene] polymer was cast into a thin film without crosslinking and a membrane-electrode-assembly was fabricated by hot-pressing Pt—Ru powder and $RuO_2$ powder gas diffusion electrodes to the opposing membrane surfaces. The ion-exchange capacity of the membrane was 1.05 mmol/g, its dry thickness was 130 μm, its equilibrium swelling in water at 25° C. was 37%, and the proton conductivity in the film (as measured by AC impedance) when equilibrated in either water or a 1.0 M methanol solution at 70° C. was 0.055$\Omega^{-1}$ $cm^{-1}$ (a proton conductance of 4.2$\Omega^{-1}$ $cm^{-2}$). Liquid methanol crossover in the polymerwas estimated by measuring the methanol oxidation limiting current density when a liquid feed solution of 1.0 M methanol was circulated past the cathode and humidified $N_2$ gas was passed by the anode (the procedure for measuring the limiting current density was the same as that reported in Ren, Zawodzinski, Uribe, Dai, and Gottesfeld, 1995, in "Proton Conducting Membrane Fuel Cells I," Electrochemical Society Proceedings, Vol 95–23, p. 284). For comparison purposes, methanol crossover was also measured in a MEA containing a Nafion® 117 membrane. For a 1.0 M methanol solution and a temperature between 40° C. and 70° C., the limiting current density for methanol in the sulfonated polyphosphazene film ranged from 6.0 mA/cm² to 10 mA/cm² and was more than one-order of magnitude lower than that for Nafion® 117, as shown by the results in Table 6.

TABLE 6

Experimentally Measured Methanol Oxidation Limiting Current Densities in Fuel Cell Membrane-Electrode Assemblies with Nafion 117 and Non-Crosslinked Polyphosphazene Membranes (with a 1.0 M methanol feed solution)

| Temperature (° C.) | Methanol Limiting Current Density (mA/cm²) | |
| --- | --- | --- |
| | Nafion 117 (180 μm thickness) | 1.05 IEC Polyphosphazene (130 μm thickness) |
| 40 | 60 | 4.5 |
| 50 | 80 | 6.0 |
| 60 | 97 | 7.9 |
| 70 | 119 | 10.0 |

What is claimed is:

1. A high proton conductance, solid polymer electrolyte membrane for use in a proton exchange membrane fuel cell, said membrane comprising: a sulfonated phosphazene polymer, the sulfonated phosphazene polymer being chemically or physically cross-linked, wherein chemical cross-links are formed between the main chains of the sulfonated phosphazene polymer, wherein the sulfonated phosphazene polymer has an ion-exchange capacity between about 0.8 and 1.9 mmole per gram of dry polymer, and wherein the cross-links are formed in a dry polymer film by means of ultraviolet light and a photo-initiator.

2. The membrane according to claim to 1, wherein the photo-initiator is benzophenone.

3. The membrane according to claim 2, wherein the benzophenone concentration in the membrane prior to exposure to ultraviolet light is between about 5 wt % and about 25 wt %.

4. The membrane according to claim 3, wherein the membrane has an ion-exchange capacity of about 1.4 mmol per gram and is ultraviolet light cross-linked using 15 percent benzophenone.

5. A high proton conductance, solid polymer electrolyte membrane for use in a proton exchange membrane fuel cell, said membrane comprising: a sulfonated phosphazene polymer, the sulfonated phosphazene polymer being chemically or physically cross-linked, wherein physical cross-links are created by blending the sulfonated phosphazene polymer with at least one substantially non-sulfonated polymer.

6. The membrane according to claim 5, wherein the sulfonated phosphazene polymer has an ion-exchange capacity between about 0.8 and about 1.9 mmol per gram of dry polymer.

7. The membrane according to claim 6, wherein the sulfonated phosphazene polymer is blended with a non-sulfonated phosphazene polymer.

8. The membrane according to claim 7, wherein the sulfonated phosphazene polymer consists of sulfonated poly[bis(3-methylphenoxy)phosphazene] and the substantially non-sulfonated phosphazene polymer consists substantially of non-sulfonated poly[bis(3-methylphenoxy)phosphazene].

9. The membrane according to claim 8, wherein chemical cross-links are formed in a membrane consisting of sulfonated poly[bis(3-methylphenoxy)phosphazene] and the substantially non-sulfonated poly[bis(3-methylphenoxy)phosphazene].

10. The membrane according to claim 9, wherein the chemical cross-links are formed in a dry polymer film by means of ultraviolet light and a photo-initiator.

11. The membrane according to claim 10, wherein the photo-initiator is benzophenone.

12. The membrane according to claim 8, wherein chemical cross-links are formed in a membrane comprising a blend of poly[bis(3-methylphenoxy)phosphazene] and a high glass-transition temperature polymer.

13. The membrane according to claim 12, wherein the chemical cross-links are formed in a dry polymer film by means of ultraviolet light and a photo-initiator.

14. The membrane according to claim 13, wherein the photo-initiator is benzophenone.

15. The membrane according to claim 6, wherein the sulfonated phosphazene polymer comprises a blend of sulfonated poly[bis(3-methylphenoxy)phosphazene] and a high glass-transition temperature polymer.

16. The membrane according to claim 15, wherein the high glass-transition temperature polymer consists of polyimide.

17. The membrane according to claim 15, wherein the high glass-transition temperature polymer consists of polyetherimide.

18. The membrane according to claim 17, wherein the polyetherimide consists of poly(bisphenol A-co4-nitrophthalic anhydride-co-1,3-phenylenediamine).

19. The membrane according to claim 15, wherein the high glass-transition temperature polymer is formed from its monomer constituents.

20. The membrane according to claim 6, wherein the membrane is formed from a casting solution consisting of a sulfonated phosphazene polymer and a high glass-transition temperature polymer, the sulfonated phosphazene polymer and the high glass-transition temperature polymer being dissolved in a solvent.

21. The membrane according to claim 6, wherein the membrane is formed from a casting solution consisting of a sulfonated phosphazene polymer and the monomer constituents of the high glass-transition temperature polymer, the sulfonated phosphazene polymer and the high glass-transition temperature polymer being dissolved in a solvent.

22. The membrane according to claim 21, wherein the high glass-transition temperature polymer is formed from the monomer constituents after film casting and during solvent evaporation at an elevated temperature.

23. The membrane according to claim 5, wherein the sulfonated phosphazene polymer and the substantially non-sulfonated polymer form and inter-penetrating polymer network.

24. A hydrogen or direct liquid-feed methanol fuel cell, comprising: an anode, a cathode, and a sulfonated phosphazene polymer electrolyte membrane operating in a hydrated state, wherein the polymer electrolyte membrane exhibits low fuel permeability.

25. A hydrogen or direct liquid-feed methanol fuel cell, comprising: an anode, a cathode, and a sulfonated phosphazene polymer electrolyte membrane operating in a hydrated state, wherein the sulfonated phosphazene polymer is chemically or physically cross-linked.

26. Fuel cell according to claim 25, wherein the physical cross-links are created by blending the sulfonated phosphazene polymer with at least one substantially non-sulfonated polymer.

27. An tonically conductive membrane, said membrane comprising: a phosphazene polymer containing acidic functional groups, wherein the polyphosphazene polymer is blended with one or more polymers having substantially no acidic functional groups, and wherein the concentration of the acidic functional groups is between about 0.8 mmole per gram of dry polymer and about 1.9 mmole per gram of dry polymer.

28. The ionically conductive membrane according to claim 27, wherein cross-links are generated in one or more of the blended polymers.

29. The tonically conductive membrane according to claim 27, wherein the acidic functional groups in the phosphazene polymer are sulfonic acid groups.

* * * * *